Figure 1:
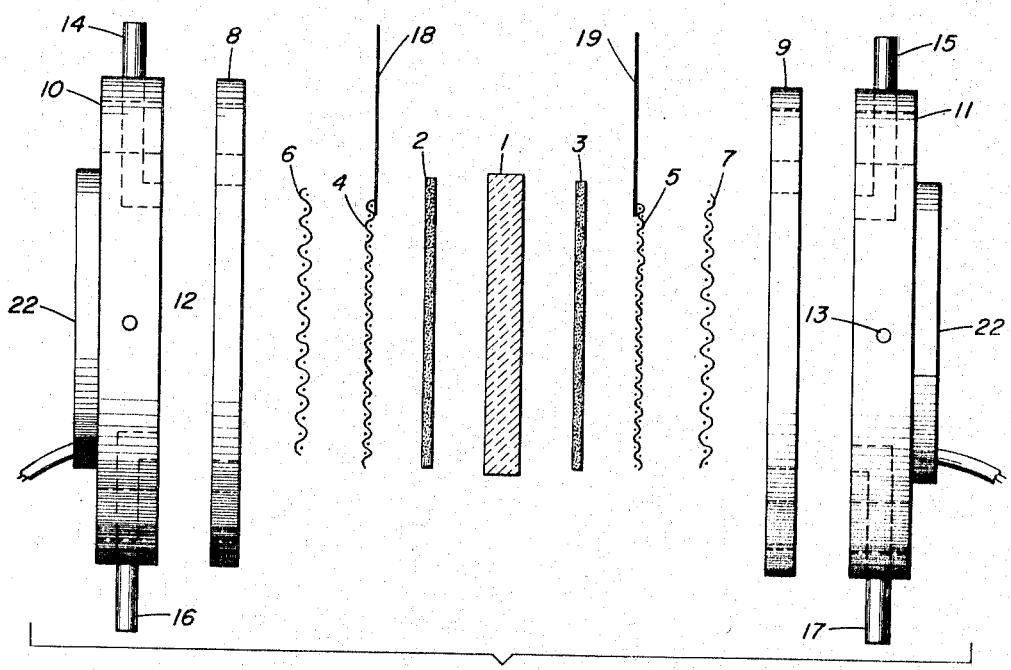

Jan. 16, 1968  W. A. BARBER  3,364,072
FUEL CELL WITH PLATINUM-RHODIUM CONTAINING CATALYST
Filed April 21, 1965

INVENTOR.
WILLIAM AUSTIN BARBER
BY
Harry H Kline
ATTORNEY

United States Patent Office 3,364,072
Patented Jan. 16, 1968

3,364,072
FUEL CELL WITH PLATINUM-RHODIUM
CONTAINING CATALYST
William Austin Barber, Stamford, Conn., assignor to American Cyanamid Company, Stamford, Conn., a corporation of Maine
Filed Apr. 21, 1965, Ser. No. 449,711
4 Claims. (Cl. 136—86)

The present invention relates to a novel multi-catalyst electrode eminently suitable for use in typical fuel cells, such as hydrogen-oxygen or hydrogen-air fuel cells. More particularly, it relates to a novel poly-component-catalytic electrode comprising a catalytic mixture of plantinum, rhodium, tungsten oxide and molybdenum oxide operative in fuel cells employing readily available hydrogen fuel contaminated with carbon monoxide.

It is known that a variety of noble and non-noble metallic catalysts has been utilized in formed electrodes. When utilizing such electrodes in fuel cells operating on hydrogen as the fuel and oxygen or air as the oxident, the purity of the hydrogen fuel is singlarly critical, for otherwise performance of the cell is markedly decreased. Specifically, electrodes perform rather poorly with increasing current densities and attendant decrease in voltages when the hydrogen fuel contains even miniscule amounts of carbon monoxide. This effect is particularly noted when as little as 40 parts per million carbon monoxide is present in the hydrogen gas stream at room temperature. To improve performance, the impure, readily available hydrogen fuel is usually purified prior to its introduction into the fuel cell to effect removal of as much carbon monoxide as possible. Undesirably, there is a substantial increase in cost in operating a fuel cell. Thus, the use of such carbon monoxide-contaminated hydrogen is not wholly acceptable.

It is, therefore, a principal object of the present invention to provide a formed, relatively inexpensive, multi-catalyst electrode which permits a fuel cell to operate on hydrogen contaminated with carbon monoxide at high voltages and current densities. A further object is to provide a straightforward method for preparing such enhanced electrodes supported on either a metallic or a non-metallic substrate. These and other advantages will become apparent from a consideration of the ensuing detailed description.

To this end, it has been unexpectedly found that a four-component catalyst mixture comprising platinum, rhodium, tungsten oxide and molybdenum oxide is required to enhance an electrode prepared therefrom to an extent hitherto unknown. While it is known that a mixture, for instance, of platinum and tungsten oxide can be employed as a catalytic electrode material, performance of the electrode is nonetheless poor when employing relatively inexpensive, carbon monoxide-contaminated hydrogen fuel. Only when utilizing substantially pure hydrogen is performance improved in such systems. Surprisingly, however, the utilization of a four-component catalytic or metallic system of the present invention substantially enhances the performance of an electrode in contradistinction to the use of one or two component catalyst electrode even while operating on readily available hydrogen gas contaminated with carbon monoxide.

According to the process of the invention, the novel catalyst mixture suitable for use as the electrode for a fuel cell utilizing carbon monoxide-impure hydrogen can be prepared by at least two straightforward procedures. One procedure involves the sodium borohydride (or potassium borohydride) reduction of a mixture comprising: (a) haloplatinic acid, such as chloroplatinic acid or bromoplatinic acid, (b) rhodium halide, such as rhodium chloride or rhodium bromide, (c) ammonium metatungstate and (d) ammonium paramolybdate in an aqueous environment. As prepared, the catalyst mixture contains essentially active platinum and rhodium metals as well as reduced oxides of tungsten and molybdenum. This mixture is combined with (a) a binder-waterproofing agent, such as polytetrafluoroethylene, polychlorotrifluoroethylene or polyethylene and (b) mineral oil to form a paste of the same. In a second alternative procedure, a mixture of tungsten oxide, molybdenum oxide and sodium borohydride-reduced platinum and rhodium can be initially admixed physically. In general, amounts ranging from about (a) 15% to about 35% platinum, (b) about 15% to about 35% rhodium, (c) about 5% to about 35% tungsten oxide and (d) about 5% to about 35% molybdenum oxide on a weight basis is established for optimum performance. It has been found that a mixture containing an equal amount of the four components enumerated is the preferred embodiment.

In general, a supporting grid or screen may advantageously be employed to receive the aforementioned catalyst mixture. The grid material to be used is choosen for its ability to withstand any corrosive condition which may exist in the particular acid electrolyte system. Illustrative of a suitable grid is: stainless steel, tantalum or acrylic fiber paper.

As a final step in forming the electrode of the present invention, it is preferred to spread the four-component catalyst paste on the screen or grid and then to dry the resultant structure. It is preferred to incorporate from about 5 to about 40 milligrams of catalyst per square centimeter of electrode surface, depending on the quantity of carbon monoxide impurity in the fuel. If the carbon monoxide content is low, i.e., below about 0.01%, as little as 5 mg./cm.$^2$ may be used. Where carbon monoxide content is high, i.e., above about 1%, as much as 35–40 mg./cm.$^2$ would be utilized.

In a typical fuel cell, a membrane or matrix separates the electrodes. The matrix is usually saturated with electrolyte. Examplary matrices are: ordinary filter paper, glass fiber paper, asbestos mat and polymeric ion exchange materials. For illustrative purposes, ordinary filter paper saturated with 5 N sulfuric acid is employed herein as the separating matrix.

In general, fuel cells hereinbelow defined and which fall within the purview of the present invention comprise three essential elements: acid electrolyte, electrodes or electrocatalysts, one of which comprises the electrode of the present invention, and current collectors. Suitable collectors can be perforated, or corrugated plates or metallic screens and equivalents thereof.

To further clarify the invention, these and other embodiments thereof are shown in the accompanying drawing and will be described in detail in conjunction with said drawing.

Figure 2:
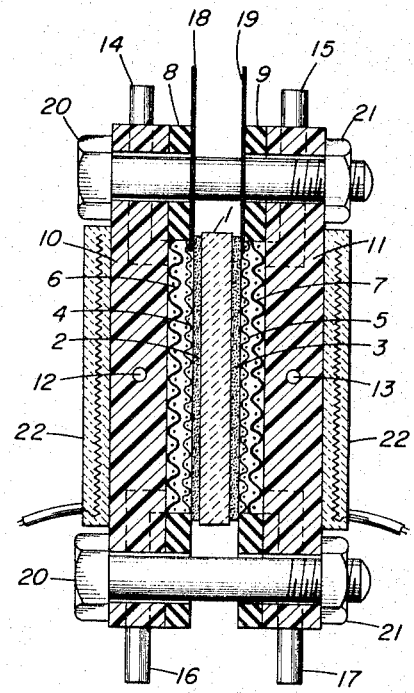

In the drawing:
FIGURE 1 is an exploded plan view, partially in section, of a fuel cell employing the electrode of the present invention, and
FIGURE 2 is a partially expanded side view, partially in section, of the fuel cell of FIGURE 1.

In FIGURE 1, a 5 N sulfuric acid saturated filter paper membrane 1 is positioned between the electrode 2 prepared by the process of the invention and a suitable oxygen electrode 3, such as platinum. Abutting the electrodes are current collector screens 4 and 5 which comprise tantalum or other suitable inert metal. Tantalum wire mesh spacers 6 and 7 are employed to compress the collector screens against the electrodes providing for better contact between screen and electrode as well as electrode and matrix. The wire mesh spacers are positioned exteriorly to the current collectors. To the outside of the spacers are gaskets 8 and 9 of any suitable material, such as polytetrafluoroethylene or silicone rubber. These seal as well as separate the chambers containing reactants. Exterior to the gaskets are housing members 10 and 11 to which are inserted and attached thermocouple 12 and heat control probe 13 and having inlet stainless steel or other inert metal tubing 14 and 15 through which readily available hydrogen contaminated with carbon monoxide and oxygen are separately introduced into the fuel cell. Stainless steel tubing 16 and 17 are provided as vents for unused gases. Wire leads 18 and 19, connected onto current collector screens 4 and 5 are the conductive members through which current flows from and to the fuel cell through the external circuit when the fuel cell is in operation. The cell, secured by means of bolts 20 and nuts 21 as shown in FIGURE 2, can be heated when desired by an external electrical heating pad 22. The temperature of the cell, determined by thermocouple 12, is controlled by heat control probe 13.

Electrodes prepared from mixtures of platinum, rhodium, tungsten oxide and molybdenum oxide catalysts and their performance are set forth in the following examples which are merely illustrative and are not to be taken as limitative of the invention. Further, each of the examples incorporate the fuel cell defined by the above drawing. Unless otherwise stated, the parts are by weight.

*Example 1*

Fifteen parts of chloroplatinic acid, 15 parts of rhodium chloride (40% rhodium), 7.5 parts of ammonium metatungstate and 7.5 parts of ammonium paramolybdate are dissolved in water and the mixture reduced by dropwise addition of sodium borohydride to give a finely divided black solid which is filtered, washed free of chloride with water, and dried in vacuum. The resulting black catalyst powder contains about equal parts of active platinum and rhodium metals as well as reduced oxides of tungsten and molybdenum. This catalyst is mixed with a 60% aqueous emulsion of polytetrafluoroethylene binder and spread on a 50 mesh tantalum screen in sufficient quantity to obtain an electrode sheet containing 20 mg. catalyst per square centimeter of electrode surface area.

An electrode disc cut from this sheet was assembled as the fuel electrode in a hydrogen-oxygen fuel cell, where the hydrogen fuel can be replaced by another fuel gas, that is, hydrogen containing various percentages of carbon monoxide. A platinum black electrode at a loading of 9 mg. Pt/cm.$^2$ is used as the oxygen electrode.

The fuel cell is operated employing hydrogen and 0.1% carbon monoxide on the fuel side. The results obtained at 70° C. with the four-component catalytic electrode of this example are presented in Table I below. To form a basis for comparison, platinum black per se, a 3-component catalytic electrode (X-3 below) consisting of 50% platinum, 25% tungsten oxide and 25% molybdenum oxide, respectively, a 2-component catalytic electrode (X-2W below) consisting of 50% platinum and 50% tungsten oxide, and a 2-component catalytic electrode (X-2M below) consisting of 50% platinum and 50% molybdenum oxide are prepared and employed in lieu of the 4-component catalytic electrode of this example. The performance data are recorded below.

TABLE I
[Performance on 0.1% CO in H$_2$ at 70° C. with 5 N H$_2$SO$_4$ electrolyte]

| Fuel Electrode, containing 20 mg. catalyst/cm.$^2$ | Current Density in ma./cm.$^2$ at— | |
|---|---|---|
| | 0.85 volts | 0.80 volts |
| Catalyst of Example 1 | 60 | 175 |
| X-3 [1] | 55 | 125 |
| X-2M [1] | 40 | 105 |
| X-2W [1] | 20 | 38 |
| Pt Black | 47 | 110 |

[1] As defined in Example 1 above.

From the above data, it will be readily noted that substantially enhanced performance is caused by the presence of the electrode utilizing the four-component catalyst mixture of this example to an extent hitherto unknown.

*Example 2*

The procedure of Example 1 is followed in every detail except that the catalyst mixture comprises 35 parts of active platinum, 35 parts of rhodium, 15 parts of reduced tungsten oxide and 15 parts of reduced molybdenum oxide in lieu of about equal parts of the catalyst. It is observed that the performance of resultant electrode is substantially the same as the electrode prepared in accordance with the procedure of Example 1.

*Example 3*

Repeating Example 1 in every detail except that the cell is operated on 1.0% carbon monoxide in hydrogen as the fuel. The results are presented in Table II below.

TABLE II
[Performance on 1.0% CO in H$_2$ at 70° C. with 5 N H$_2$SO$_4$ electrolyte]

| Fuel Electrode, containing 20 mg. catalyst/cm.$^2$ | Current Density in ma./cm.$^2$ at— | | |
|---|---|---|---|
| | .80 volts | .75 volts | .70 volts |
| Catalyst of Example 1 | 72 | 130 | 190 |
| X-3 [1] | 60 | 105 | 150 |
| X-2M [1] | 63 | 100 | 150 |
| X-2W [1] | 8 | 15 | 22 |
| Pt Black | 55 | 90 | 160 |

[1] As defined in Example 1 above.

I claim:
1. A fuel cell utilizing hydrogen fuel contaminated with carbon monoxide comprising in combination: a matrix and electrodes abutting said matrix, at least one of the said electrodes comprising a four-component catalyst mixture containing (a) from about 15% to about 35% platinum, (b) from about 15% to about 35% rhodium, (c) from about 5% to about 35% tungsten oxide and (d) from about 5% to about 35% molybdenum oxide, all percentages being by weight.

2. The fuel cell according to claim 1 wherein the electrode is positioned on the fuel side and comprises said four-component catalyst mixture.

3. The fuel cell according to claim 2 wherein the four-component catalyst mixture comprises equal parts by weight of platinum, rhodium, tungsten oxide and molybdenum oxide.

4. The fuel cell according to claim 2 wherein the four-component catalyst mixture comprises 35% platinum, 35% rhodium, 15% tungsten oxide and 15% molybdenum oxide, all percentages being by weight.

References Cited

UNITED STATES PATENTS 3,212,930 10/1965 Thompson et al. ___ 136—120 X
3,232,887 2/1966 Pessimisis _____ 252—470 X ALLEN B. CURTIS, *Primary Examiner.*

WINSTON A. DOUGLAS, *Examiner.*

O. F. CRUTCHFIELD, N. P. BULLOCH,
*Assistant Examiners.*